US009418576B2

(12) United States Patent
Franklin

(10) Patent No.: US 9,418,576 B2
(45) Date of Patent: Aug. 16, 2016

(54) DISSOLVABLE THERMAL DIRECT ADHESIVE LABEL AND LABEL ASSEMBLY INCLUDING THE SAME

(75) Inventor: Priscilla Franklin, Cincinnati, OH (US)

(73) Assignee: Avery Dennison Corporation, Glendale, CA (US)

( * ) Notice: Subject to any disclaimer, the term of this patent is extended or adjusted under 35 U.S.C. 154(b) by 497 days.

(21) Appl. No.: 12/152,463

(22) Filed: May 14, 2008

(65) Prior Publication Data

US 2009/0286032 A1    Nov. 19, 2009

(51) Int. Cl.
*G09F 3/10* (2006.01)
*D21H 11/00* (2006.01)
(Continued)

(52) U.S. Cl.
CPC ............... *G09F 3/0291* (2013.01); *B32B 7/04* (2013.01); *B32B 9/00* (2013.01); *B32B 27/10* (2013.01); *B32B 29/00* (2013.01); *B32B 2307/7166* (2013.01); *B41M 5/323* (2013.01); *B41M 5/333* (2013.01); *B41M 5/44* (2013.01); *B41M 2205/04* (2013.01); *B41M 2205/40* (2013.01); *C08L 33/04* (2013.01); *C09J 7/0217* (2013.01); *C09J 7/0225* (2013.01); *C09J 7/04* (2013.01); *C09J 7/045* (2013.01); *C09J 7/046* (2013.01); *C09J 9/00* (2013.01); *C09J 133/14* (2013.01); *C09J 155/005* (2013.01); *C09J 2401/006* (2013.01); *D21H 11/00* (2013.01); *D21H 13/04* (2013.01); *D21H 19/34* (2013.01); *G09F 2003/022* (2013.01); *G09F 2003/0211* (2013.01); *G09F 2003/0225* (2013.01); *G09F 2003/0242* (2013.01); *Y10S 428/913* (2013.01); *Y10T 428/1476* (2015.01); *Y10T 428/24* (2015.01); *Y10T 428/28* (2015.01); *Y10T 428/2848* (2015.01); *Y10T 428/2891* (2015.01)

(58) Field of Classification Search
None
See application file for complete search history.

(56) References Cited

U.S. PATENT DOCUMENTS 3,431,166 A    3/1969    Mizutani et al.
3,539,375 A    11/1970    Baum
(Continued)

FOREIGN PATENT DOCUMENTS

DE    4433006    3/1996
EP    764705 A1 *    3/1997    ............... C09J 7/02
(Continued)

OTHER PUBLICATIONS

Translation of JP 2004314623 A, Nov. 2004.*
(Continued)

*Primary Examiner* — Jeff Vonch
(74) *Attorney, Agent, or Firm* — Avery Dennison Corporation

(57) ABSTRACT

A label assembly including one or more dissolvable thermal direct adhesive labels mounted on a release liner. According to one embodiment, each label includes a base layer, a thermal direct layer, an adhesive layer, and a barrier layer. The base layer, which has an upper surface and a lower surface, is water-dissolvable and may be made of a water-dissolvable paper. The thermal direct layer is positioned directly over the upper surface of the base layer and functions in the conventional manner to produce markings therein in response to heat. The adhesive layer is water-dissolvable and is positioned below the lower surface of the base layer. The barrier layer, which is positioned directly below the lower surface of the base layer and directly over the adhesive layer, serves to prevent migration of the adhesive layer through the base layer and into contact with the thermal direct layer.

9 Claims, 3 Drawing Sheets

(51) Int. Cl.

| | | |
|---|---|---|
| *B41M 5/42* | (2006.01) | |
| *B41M 5/44* | (2006.01) | |
| *B41M 5/323* | (2006.01) | |
| *B41M 5/333* | (2006.01) | |
| *C09J 7/04* | (2006.01) | |
| *C09J 133/14* | (2006.01) | |
| *C09J 155/00* | (2006.01) | |
| *B32B 7/04* | (2006.01) | |
| *B32B 27/10* | (2006.01) | |
| *B32B 29/00* | (2006.01) | |
| *G09F 3/00* | (2006.01) | |
| *D21H 19/34* | (2006.01) | |
| *G09F 3/02* | (2006.01) | |
| *C08L 33/04* | (2006.01) | |
| *C09J 9/00* | (2006.01) | |
| *C09J 7/02* | (2006.01) | |
| *B32B 9/00* | (2006.01) | |
| *D21H 13/04* | (2006.01) | |

(56) References Cited

U.S. PATENT DOCUMENTS

| | | | | |
|---|---|---|---|---|
| 3,674,535 | A | | 7/1972 | Blose et al. |
| 3,740,081 | A | * | 6/1973 | Whipperman .............. 283/97 |
| 3,746,675 | A | | 7/1973 | Blose et al. |
| 4,151,748 | A | | 5/1979 | Baum |
| 4,181,771 | A | | 1/1980 | Hanson et al. |
| 4,246,318 | A | | 1/1981 | Baum |
| 4,370,370 | A | * | 1/1983 | Iwata et al. ............... 428/41.6 |
| 4,388,362 | A | * | 6/1983 | Iwata ...................... B41M 5/44 427/150 |
| 4,424,245 | A | * | 1/1984 | Maruta et al. ............... 503/209 |
| 4,444,839 | A | | 4/1984 | Dudzik et al. |
| 4,470,057 | A | | 9/1984 | Glanz |
| 4,740,495 | A | | 4/1988 | Marinelli et al. |
| 4,855,277 | A | * | 8/1989 | Walter ...................... B41M 5/30 427/150 |
| 4,898,849 | A | | 2/1990 | Kang |
| 5,395,907 | A | * | 3/1995 | Zajaczkowski ............... 526/320 |
| 5,821,196 | A | | 10/1998 | Schulz et al. |
| 5,843,864 | A | | 12/1998 | Popp et al. |
| 6,525,129 | B1 | | 2/2003 | Su et al. |
| 6,562,755 | B1 | | 5/2003 | Halbrook, Jr. et al. |
| 6,787,208 | B2 | | 9/2004 | Galovic |
| 7,476,448 | B2 | | 1/2009 | Natsui et al. |
| 8,017,207 | B2 | * | 9/2011 | Hacikyan ...................... 428/40.1 |
| 2003/0012910 | A1 | | 1/2003 | Galovic |
| 2004/0163556 | A1 | * | 8/2004 | Kugo et al. ................... 101/226 |
| 2006/0216537 | A1 | * | 9/2006 | Natsui et al. ................ 428/537.5 |
| 2009/0252905 | A1 | * | 10/2009 | Hill et al. ...................... 428/34.2 |

FOREIGN PATENT DOCUMENTS

| | | | | |
|---|---|---|---|---|
| GB | 2259291 | | 3/1993 | |
| JP | 04097885 | A * | 3/1992 | ............... B41M 5/26 |
| JP | 06297840 | A * | 10/1994 | ............... B41M 5/26 |
| JP | 08211829 | A * | 8/1996 | ............... G09F 3/10 |
| JP | 2004314623 | A * | 11/2004 | ............... B41M 5/26 |
| JP | 2007237634 | A * | 9/2007 | |

OTHER PUBLICATIONS

U.S. Appl. No. 61/123,330, filed Apr. 2008.*
S.E. Smith, What is Rice Paper?, Aug. 22, 2007, www.wisegeek.com.*
Translation of EP 764705 A1, Mar. 1997.*
Aquasol Paper, Apr. 2008.*
Machine Translation of JP 08211829 A, Aug. 1996.*
Machine Translation of JP 2007237634 A, Sep. 2007.*
Machine Translation of JP 06297840 A, Oct. 1994.*
English Abstract for JP 04097885 A, Mar. 1992.*
English Translation of JP 2007-237634 A, Sep. 2007.*
European Search Report dated May 21, 2010 for European Application No. EP 09006555.

* cited by examiner

DISSOLVABLE THERMAL DIRECT ADHESIVE LABEL AND LABEL ASSEMBLY INCLUDING THE SAME

BACKGROUND OF THE INVENTION

The present invention relates generally to adhesive labels and relates more particularly to dissolvable adhesive labels.

Reusable containers often have an adhesive label attached thereto to convey certain information about the contents of the container. For example, in the restaurant industry, food is commonly stored in reusable food containers that have an attached adhesive label indicating the type of food contained in the container, the expiration date of the food, etc. Once the contents of the container have been removed, such containers may be cleaned and reused. It is highly desirable that, after each use, the adhesive label be completely removed from the container. This is, in part, because adhesive residue left on the container after washing may lead to bacterial growth on the container. Such bacteria growth may lead to spoilage or contamination of the contents of the container.

One approach to this problem has been to devise an adhesive label that dissolves when contacted with water. Such a water-dissolvable adhesive label is commercially available from Avery Dennison Corporation (Pasadena, Calif.) as DIS-SOLVX® label. The aforementioned DISSOLVX® label includes a water-dissolvable paper, onto one surface of which a water-dissolvable adhesive is applied, the exposed surface of the water-dissolvable adhesive being covered with a release liner. In use, the desired information is typically handwritten onto the exposed surface of the water-dissolvable paper, the release liner is then peeled away from the adhesive, and the exposed adhesive is then applied to the container or other object. (Instead of handwriting the information on the paper layer of the label, a hand-held ink labeler may be used to print the information onto the paper layer of the label.)

SUMMARY OF THE INVENTION

It is an object of the present invention to provide a new dissolvable adhesive label.

Therefore, according to one aspect of the invention, there is provided a dissolvable thermal direct adhesive label, the dissolvable thermal direct adhesive label comprising (a) a base layer, the base layer being water-dissolvable and having an upper surface and a lower surface; (b) a thermal direct layer, the thermal direct layer being positioned over and coupled to the upper surface of the base layer; and (c) an adhesive layer, the adhesive layer being water-dissolvable, the adhesive layer being positioned below and coupled to the lower surface of the base layer.

One advantage of the dissolvable adhesive label of the present invention, as compared to existing dissolvable adhesive labels, is that the dissolvable adhesive label of the present invention includes a thermal direct layer. As a result, information that one wishes to convey on the label may be printed on the label using thermal direct printing. Thermal direct printing affords a user with flexibility and ease of printing, particularly volume-printing, that far exceeds that obtained by handwriting or using hand-held ink labelers. In addition, thermal direct printing may permit the printing of machine-readable information, such as bar codes and the like.

According to another aspect of the invention, there is provided a label assembly, the label assembly comprising (a) a release liner; and (b) a plurality of dissolvable thermal direct adhesive labels releasably mounted on the release liner, each of said plurality of dissolvable thermal direct adhesive labels comprising (i) a base layer, the base layer being water-dissolvable and having an upper surface and a lower surface, (ii) a thermal direct layer, the thermal direct layer being positioned over and coupled to the upper surface of the base layer, and (iii) an adhesive layer, the adhesive layer being water-dissolvable, the adhesive layer being positioned below and coupled to the lower surface of the base layer.

Additional objects, features, advantages and aspects of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
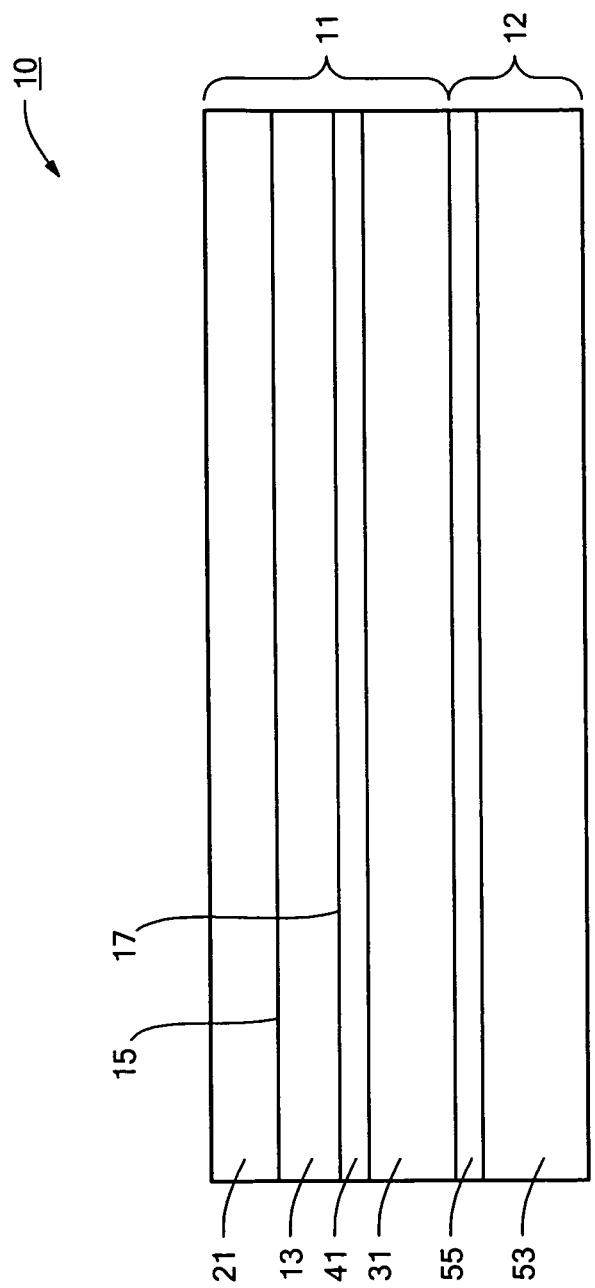
FIG. 1 is a schematic side view of a first embodiment of a label assembly constructed according to the teachings of the present invention, said label assembly including a dissolvable thermal direct adhesive label.

Referring now to FIG. 1, there is shown a schematic side view of a first embodiment of a label assembly constructed according to the teachings of the present invention, said label assembly being represented generally by reference numeral 10.

Label assembly 10 may comprise a dissolvable thermal direct adhesive label 11 and a peelable release liner 12, dissolvable thermal direct adhesive label 11 being releasably mounted on top of release liner 12.

Label 11, in turn, may comprise a water-dissolvable base layer 13, base layer 13 having an upper surface 15 and a lower surface 17. Base layer 13 may comprise a water-dissolvable paper. For reasons to become apparent below, base layer 13 preferably has a relatively low porosity/relatively high density and a relatively smooth upper surface 15. The aforementioned low porosity/high density and smooth upper surface 15 may be improved, for example, by calendering base layer 13. An example of a water-dissolvable paper that may be suitable for use as base layer 13 is AQUASOL® paper (Aquasol Corporation, North Tonawand, N.Y.), a water-dissolvable paper made of sodium carboxy methyl cellulose and wooden pulp. AQUASOL® paper has a basis weight of about 53.5 lbs per ream (500 sheets 25 inches by 38 inches), a caliper of about 3.8 mil, a tensile strength (machine direction) of about 30 g, a tear strength (machine direction) of about 34 g, and a smoothness of 115 SU and 132 SU for its upper and lower surfaces, respectively (measured using a HAGERTY SMOOTHNESS TESTER device, Hagerty Technologies, Inc., Queensbury, N.Y.).

Another example of a water-dissolvable paper that may be suitable for use as base layer 13 is a water-dissolvable rice paper.

Further examples of materials that may be suitable for use as base layer 13 are disclosed in the following U.S. patents, all of which are incorporated herein by reference: U.S. Pat. No. 6,787,208, inventor Galovi, which issued Sep. 7, 2004; U.S. Pat. No. 6,525,129, inventors Su et al., which issued Feb. 25, 2003; and U.S. Pat. No. 3,431,166, inventors Mizutani et al., which issued Mar. 4, 1969.

Label 11 may additionally comprise a thermal direct layer 21. Thermal direct layer 21 may be positioned directly over and in contact with upper surface 15 of base layer 13. Thermal direct layer 21 may be conventional in its composition. Preferably, thermal direct layer 21 is water-dispersible or water-soluble. Thermal direct layer 21 may comprise a basic chromogenic material and an acidic color developer material, both of which may be contained in a solid matrix or binder, wherein, when layer 21 is heated, one or both of the chromogenic material and the developer material may be caused to flow into contact with one another and react, thereby producing a colored mark. The coat weight of thermal direct layer 21 may be about 3 lbs per ream (500 sheets 25 inches by 38 inches).

Examples of compounds that may be suitable for use as the aforementioned basic chromogenic material may include (i) leuco dyes, such as 3,3-bis(p-dimethylaminophenyl)-phthalide; 3,3-bis(p-dimethylaminophenyl)-6-dimethylaminophthalide (Crystal Violet Lactone); 3,3-bis(p-dimethylaminophenyl)-6-diethylaminophthalide; 3,3-bis(p-dimethylaminophenyl)-6-chlorophthalide; and 3,3-bis(p-dibutylaminophenyl)-phthalide, (ii) leuco bases of fluoran dyes, such as 3-cyclohexylamino-6-chlorofluoran; 3-(N,N-diethylamino)-5-methyl-7-(N,N-dibenzylamino)fluoran; 3-dimethylamino-5,7-dimethylfluoran; 3-diethylamino-7-methylfluoran; 3-diethylamino-6-methyl-7-chlorofluoran; 3-pyrrolidino-6-methyl-7-anilinofluoran; and 2-[3,6-bis(diethylamino)-9-(0-chloroanilino)xanthylbenzoic acid lactam]; and (iii) lactone compounds, such as 3-(2'-hydroxy-4'-dimethylaminophenyl)-3-(2'[-methoxy-5'-chlorophenyl) phthalide; 3-(2'-hydroxy-4'-dimethylaminophenyl)-3-(2'-methoxy-5'-nitrophenylphthalide; 3-(2'-hydroxy-4'-diethylaminophenyl)-3-(2'-methoxy-5'-methylphenyl) phthalide; and 3-(2'-methoxy-4'-dimethylaminophenyl)-3-(2'-hydroxy-4'-chloro-5'-methylphenyl)-phthalide.

Examples of compounds that may be suitable for use as the above-mentioned developer material may include phenol compounds, organic acids or metals salts thereof, and hydroxybenzoic acid esters. Preferred color developers may be phenol compounds and organic acids which melt at about 50° C. to 250° C. and are sparingly soluble in water. Examples of suitable phenols may include 4,4'-isopropylene-diphenol (bisphenol A); p-tert-butylphenol; 2,4-dinitrophenol; 3,4-dichlorophenol; p-phenylphenol; 4,4-cyclohexylidenephenol; 2,2-bis(4'-hydroxyphenyl)-n-heptane; and 4,4'-cyclohexylidene phenol. Examples of suitable organic acid and metal salts thereof include 3-tert-butylsalicylic acid; 3,5-tert-butylsalicylic acid; 5-a-methylbenzylsalicylic acid and salts thereof of zinc, lead, aluminum, magnesium or nickel.

Examples of compounds that may be suitable for use as the above-mentioned solid matrix or binder material may include (i) water soluble binders, such as polyvinyl alcohol; hydroxy ethylcellulose; methylcelluose; methyl-hydroxypropylcellulose; starch; modified starches; gelatin and the like, and (ii) latex materials, such as polyacrylates; polyvinylacetates; polystyrene and the like.

Thermal direct layer 21 may additionally include a sensitizer or thermosensitivity promoter agent to enhance color density. Examples of compounds that may be suitable for use as a sensitizer may include fatty acid amide compounds, such as acetamide, stearic acid amide, linolenic acid amide, lauric acid amide, myristic acid amide, methylol compounds or the above mentioned fatty acid amides, such as methylene-bis (stearamide), and ethylene-bis(stearamide), and compounds of p-hydroxybenzoic acid esters, such as methyl p-hydroxybenzoate, n-propyl p-hydroxybenzoate, isopropyl p-hydroxybenzoate, benzyl p-hydroxybenzoate.

The components of thermal direct layer 21 may be substantially homogeneously distributed therethroughout. In manufacturing thermal direct layer 21, a coating composition may be prepared, which coating composition may include a fine dispersion of the components of the color-forming system, the solid matrix material, surface active agents, and other additives in an aqueous coating medium. The coating composition may further include inert pigments, such as clay, talc, aluminum hydroxide, calcined kaolin clay and calcium carbonate; synthetic pigments, such as urea-formaldehyde resin pigments; natural waxes, such as Carnuba wax; synthetic waxes; lubricants, such as zinc stearate; wetting agents and defoamers. Thermal layer 21 may be formed by coating, for example, in the conventional manner, the aforementioned coating composition directly onto upper surface 15 of base layer 13. (Because base layer 13 is water-dissolvable, it may be desirable to adjust the water content of the coating composition to minimize the dissolving of base layer 13 during the coating process.) As noted above, base layer 13 preferably has a low porosity/high density and a smooth upper surface 15. Such properties of base layer 13 minimize variations in the physical uniformity of thermal layer 21 coated thereover and, thereby, improve the legibility of information conveyed by thermal layer 21.

Additional information regarding the composition and preparation of thermal direct layer 21 may be found in the following U.S. patents, all of which are incorporated herein by reference: U.S. Pat. No. 6,562,755, inventors Halbrook, Jr. et al., which issued May 13, 2003; U.S. Pat. No. 5,821,196, inventors Schulz et al., which issued Oct. 13, 1998; U.S. Pat. No. 4,470,057, inventor Glanz, which issued Sep. 4, 1984; U.S. Pat. No. 4,246,318, inventor Baum, which issued Jan. 20, 1981; U.S. Pat. No. 4,181,771, inventors Hanson et al., which issued Jan. 1, 1980; U.S. Pat. No. 4,151,748, inventor Baum, which issued May 1, 1979; U.S. Pat. No. 3,746,675, inventors Blose et al., which issued Jul. 17, 1973; U.S. Pat. No. 3,674,535, inventors Blose et al., which issued Jul. 4, 1972; and U.S. Pat. No. 3,539,375, inventor Baum, which issued Nov. 10, 1970.

Label 11 may further comprise a water-dissolvable, pressure-sensitive adhesive layer 31, adhesive layer 31 being positioned below lower surface 17 of base layer 13. Examples of adhesive materials that may be suitable for use as adhesive layer 31 may include acrylic emulsion based adhesives and copolymers of a carboxylic hydroxyalkyl ester monomer and an ethoxylated or propoxylated hydroxyalkyl(meth)acrylate. Additional adhesives suitable for use as adhesive layer 31 may be found, for example, in the following patents, all of which are incorporated herein by reference: U.S. Pat. No. 6,787,208, inventor Galovic, which issued Sep. 7, 2004; U.S. Pat. No. 6,525,129, inventors Su et al., which issued Feb. 25, 2003; and U.S. Pat. No. 5,395,907, inventor Zajaczkowski, which issued Mar. 7, 1995.

Label 11 may optionally further comprise a barrier layer 41, barrier layer 41 being positioned directly below and in contact with lower surface 17 of base layer 13 and being positioned directly above and in contact with adhesive layer 31. The purpose of barrier layer 41 is to prevent the migration of adhesive layer 31 through base layer 13 and into contact with thermal direct layer 21, where adhesive layer 31 may cause the undesired activation of the coloring system of thermal direct layer 21. Accordingly, barrier layer 41 may comprise a suitable coating, such as a resin-based coating, capable of sealing the pores of base layer 13 while, at the same time, being sufficiently inert so as not to affect the desired characteristics of adhesive layer 31, base layer 13, or thermal direct layer 21. Preferably, barrier layer 41 is water-dispersible or water-soluble.

Figure 3:
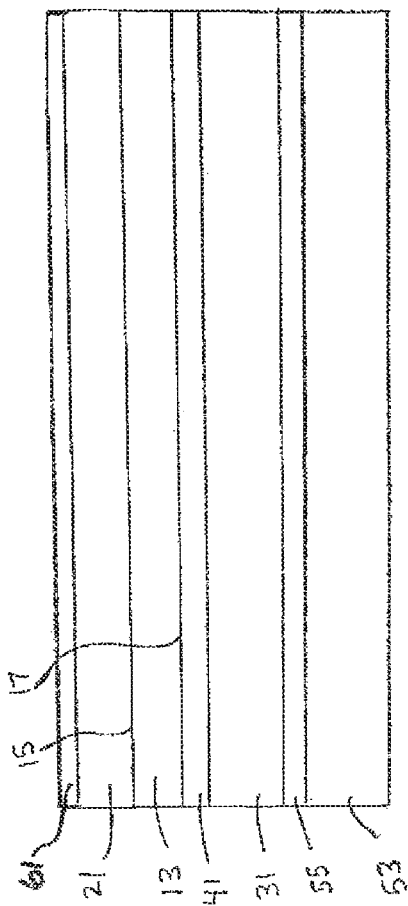
FIG. 3 is a schematic side view of a third embodiment of a label assembly constructed according to the teachings of the present invention, said label assembly including a dissolvable thermal direct adhesive label.

Label 11 may further comprise a protective overcoat (see, for example, protective overcoat 61 in FIG. 3) applied directly on top of thermal direct layer 21. Such an overcoat may be conventional in nature and may include one or more acrylate coatings, polyvinyl alcohol coatings, polyvinyl chloride coatings, styrenated layers and styrenated maleic anhydride layers as described in U.S. Pat. No. 5,843,864, which is incorporated herein by reference, and cellulose binders with a synthetic wax, as described in U.S. Pat. No. 4,740,495, which is incorporated herein by reference.

Release liner 12, which may be conventional in construction, may include a support 53 and a release 55. Support 53 may comprise, for example, paper, plastic-coated paper or a polymeric film. Release 55, which may be applied to the top surface of support 53 and which may be in direct contact with the bottom surface of adhesive layer 31, may be, for example, a silicone coating. To facilitate the peeling away of release liner 12 from label 11, release liner 12 may have a different footprint than label 11, may be cut into a plurality of pieces, or may include a tear-line to facilitate being torn into a plurality of pieces.

To produce label assembly 10, the adhesive composition used to form adhesive layer 31 may be applied to the top surface of release 55 of release liner 51 using a conventional method. The coated adhesive may then be air-dried or oven-dried to form adhesive layer 31 on release liner 51. Independently of the above, thermal layer 21 may be applied to top surface 15 of base layer 13, and barrier layer 41 may be applied to bottom surface 17 of base layer 13. Then, barrier layer 41 may be laminated to the adhesively-coated release liner to form assembly 10.

In use, label assembly 10 may be fed into a conventional thermal direct printer, and desired information may be printed on thermal layer 21 using the thermal direct printer in the conventional fashion. Thereafter, label 11 may be peeled away from release liner 12, and label 11 may be adhered to a suitable object by contacting adhesive layer 31 with the object. When removal of label 11 from the object is desired, label 11 is contacted with water, causing label 11 to dissolve, disperse or otherwise disintegrate.

Figure 2:
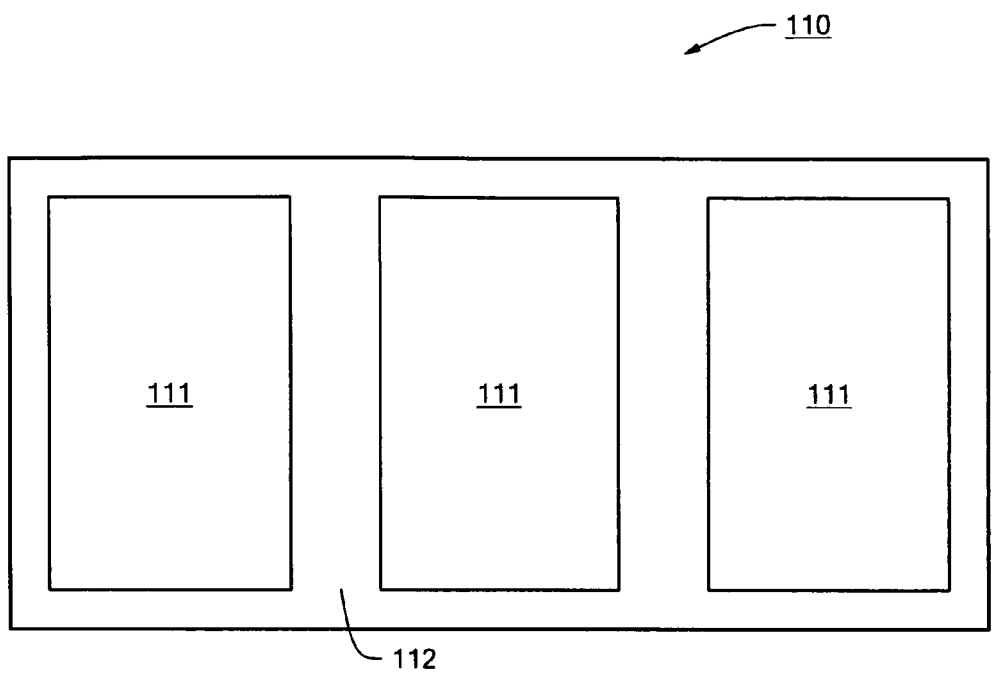
FIG. 2 is a schematic top view of a second embodiment of a label assembly constructed according to the teachings of the present invention, said label assembly including a plurality of dissolvable thermal direct adhesive labels.

It should be understood that, although label assembly 10 is shown with only a single label 11 releasably mounted on release liner 12, the present invention is not limited to such a construction and may include assemblies in which a plurality of labels are releasably mounted on a common release liner. One example of such an assembly is shown in FIG. 2 and is represented generally by reference numeral 110. Assembly 110 may include a plurality of labels 111 releasably mounted on a common release liner 112 (it being understood that the number of labels 111 shown in assembly 110 is merely illustrative). Each of labels 111 may be identical to label 11. Release liner 112 may be similar in most respects to release liner 12, the principal difference being that release liner 112 may be appropriately dimensioned to accommodate a plurality of labels 111 thereon.

Assembly 110 may be formed by providing a continuous laminate comprising a thermal direct layer, a water-dissolvable base layer, a barrier layer, a water-dissolvable adhesive layer, and a release liner, wherein all of said components have a substantially identical footprint, and then die-cutting or otherwise converting the laminate to produce a plurality of discrete labels 111 on a common release liner 112.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A dissolvable thermal direct adhesive label comprising:
   (a) a base layer, the base layer being water-dissolvable and having an upper surface and a lower surface, wherein the base layer is a monolayer of a water-dissolvable paper made of sodium carboxy methyl cellulose and wooden pulp;
   (b) a thermal direct layer, the thermal direct layer being positioned over and in direct contact with the upper surface of the base layer, the thermal direct layer being coupled to the upper surface of the base layer, wherein the thermal direct layer is one of water-dispersible and water-soluble, wherein the thermal direct layer is a monolayer comprising a basic chromogenic material and an acidic color developer material, both of which are contained in a solid matrix, and wherein the components of the thermal direct layer are substantially homogeneously distributed therethroughout;
   (c) an adhesive layer, the adhesive layer being water-dissolvable, the adhesive layer being positioned below and coupled to the lower surface of the base layer, wherein the adhesive layer comprises copolymers of a carboxylic hydroxyalkyl ester monomer and an ethoxylated or propoxylated hydroxyalkyl (meth)acrylate;
   (d) a water-soluble barrier layer, the water-soluble barrier layer being positioned below and in direct contact with the lower surface of the base layer and being positioned above and in direct contact with the adhesive layer, the water-soluble barrier layer preventing migration of the adhesive layer through the base layer and into contact with the thermal direct layer; and
   (e) a protective overcoat, the protective overcoat being positioned over and in direct contact with the thermal direct layer, the protective overcoat comprising one or more acrylate coatings, polyvinyl chloride coatings, styrenated layers and styrenated maleic anhydride layers.

2. The dissolvable thermal direct adhesive label as claimed in claim 1 wherein the adhesive layer is a pressure-sensitive adhesive layer.

3. A label assembly comprising a release liner and a dissolvable thermal direct adhesive label as recited in claim 1, the dissolvable thermal direct adhesive label being releasably mounted on the release liner.

4. The label assembly as claimed in claim 3 wherein the release liner comprises a support and a release, the release being positioned over the support, the dissolvable thermal direct adhesive label being positioned over the release.

5. The label assembly as claimed in claim 4 wherein the adhesive layer of the dissolvable thermal direct adhesive label is in direct contact with the release.

6. A label assembly comprising:
(a) a release liner; and
(b) a plurality of dissolvable thermal direct adhesive labels releasably mounted on the release liner, each of said plurality of dissolvable thermal direct adhesive labels comprising
  (i) a base layer, the base layer being water-dissolvable and having an upper surface and a lower surface, wherein the base layer is a monolayer of a water-dissolvable paper made of sodium carboxy methyl cellulose and wooden pulp,
  (ii) a thermal direct layer, the thermal direct layer being positioned over and in direct contact with the upper surface of the base layer, the thermal direct layer being coupled to the upper surface of the base layer, wherein the thermal direct layer is one of water-dispersible and water-soluble, wherein the thermal direct layer is a monolayer comprising a basic chromogenic material and an acidic color developer material, both of which are contained in a solid matrix, and wherein the components of the thermal direct layer are substantially homogeneously distributed therethroughout,
  (iii) an adhesive layer, the adhesive layer being water-dissolvable, the adhesive layer being positioned below and coupled to the lower surface of the base layer, wherein the adhesive layer comprises copolymers of a carboxylic hydroxyalkyl ester monomer and an ethoxylated or propoxylated hydroxyalkyl (meth) acrylate,
  (iv) a water-soluble barrier layer, the water-soluble barrier layer being positioned below and in direct contact with the lower surface of the base layer and being positioned above and in direct contact with the adhesive layer, the water-soluble barrier layer preventing migration of the adhesive layer through the base layer and into contact with the thermal direct layer, and
  (v) a protective overcoat, the protective overcoat being positioned over and in direct contact with the thermal direct layer, the protective overcoat comprising one or more acrylate coatings, polyvinyl chloride coatings, styrenated layers and styrenated maleic anhydride layers.

7. The label assembly as claimed in claim 6 wherein the adhesive layer is a pressure-sensitive adhesive layer.

8. The label assembly as claimed in claim 6 wherein the release liner comprises a support and a release, the release being positioned over the support and wherein each of the dissolvable thermal direct adhesive labels is positioned over the release.

9. The label assembly as claimed in claim 8 wherein the adhesive layer of each of the dissolvable thermal direct adhesive labels is in direct contact with the release.

* * * * *